US009064161B1

(12) United States Patent
Boman et al.

(10) Patent No.: US 9,064,161 B1
(45) Date of Patent: Jun. 23, 2015

(54) SYSTEM AND METHOD FOR DETECTING GENERIC ITEMS IN IMAGE SEQUENCE

(75) Inventors: Robert Boman, Thousand Oaks, CA (US); Luis Goncalves, Pasadena, CA (US); James Ostrowski, South Pasadena, CA (US)

(73) Assignee: Datalogic ADC, Inc., Eugene, OR (US)

( * ) Notice: Subject to any disclaimer, the term of this patent is extended or adjusted under 35 U.S.C. 154(b) by 303 days.

(21) Appl. No.: 11/811,211

(22) Filed: Jun. 8, 2007

(51) Int. Cl.
G06K 15/00 (2006.01)
G06K 7/01 (2006.01)
G06K 7/00 (2006.01)

(52) U.S. Cl.
CPC ... *G06K 7/01* (2013.01); *G06K 7/00* (2013.01)

(58) Field of Classification Search
USPC ........................................................ 235/383
See application file for complete search history.

(56) References Cited

U.S. PATENT DOCUMENTS

| 6,711,293 | B1 | 3/2004 | Lowe |
| 7,100,824 | B2 | 9/2006 | Ostrowski et al. |
| 7,246,745 | B2 | 7/2007 | Hudnut et al. |
| 7,337,960 | B2 | 3/2008 | Ostrowski et al. |
| 7,646,887 | B2 | 1/2010 | Goncalves et al. |
| 7,725,484 | B2 | 5/2010 | Nistér et al. |
| 7,842,876 | B2 | 11/2010 | Benyamin |
| 8,325,982 | B1 * | 12/2012 | Moon et al. ................... 382/103 |
| 2004/0130620 | A1 * | 7/2004 | Buehler et al. ............... 348/143 |
| 2005/0189412 | A1 * | 9/2005 | Hudnut et al. ................ 235/383 |
| 2006/0081714 | A1 * | 4/2006 | King et al. .............. 235/472.03 |
| 2006/0147087 | A1 * | 7/2006 | Goncalves et al. ........... 382/103 |
| 2006/0171419 | A1 * | 8/2006 | Spindola et al. .............. 370/477 |
| 2006/0283943 | A1 | 12/2006 | Ostrowski et al. |
| 2007/0102523 | A1 * | 5/2007 | Kong ..................... 235/462.16 |

OTHER PUBLICATIONS

Kelson R.T. Aires, Plane Detection Using Affine Homography, Department of Computing Engineering and Automation, Federal University of Rio Grande do Norte, Brazil, ftp://adelardo:web@users.dca.ufrn.br/artigos/CBA08a.pdf.*
Lowe, "Object Recognition from Local Scale-Invariant Features," Proceedings of the International Conference on Computer Vision, Corfu, Greece, Sep. 1999.
Lowe, "Local Feature View Clustering for 3D Object Recognition," Proceedings of the IEEE Conference on Computer Vision and Pattern Recognition, Kauai, Hawaii, Dec. 2001.
Bay et al., "SURF: Speeded Up Robust Features," Computer Vision and Image Understanding (CVIU), vol. 110, No. 3, pp. 346-359 (2008).

(Continued)

*Primary Examiner* — Michael G Lee
*Assistant Examiner* — David Tardif
(74) *Attorney, Agent, or Firm* — Stoel Rives LLP

(57) ABSTRACT

A system and method for detecting the presence of known or unknown objects based on visual features is disclosed. In the preferred embodiment, the system is a checkout system for detecting items of merchandise on a shopping cart. The merchandise checkout system preferably includes a feature extractor for extracting visual features from a plurality of images; a motion detector configured to detect one or more groups of the visual features present in at least two of the plurality of images; a classifier to classify each of said groups of the visual features based on one or more classification criteria, wherein each of the one or more parameters is associated with one of said groups of visual features; and an alarm configured to generate an alert if the one or more parameters for any of said groups of the visual features satisfy one or more classification criteria.

26 Claims, 7 Drawing Sheets

(56) References Cited

OTHER PUBLICATIONS

Duda et al., "Pattern Classification," pp. 526-528, 2nd Edition, John Wiley & Sons, Inc., New York, 2001.

Goncalves et al., U.S. Appl. No. 13/107,824, filed May 13, 2011, titled Systems and Methods for Object Recognition Using a Large Database.

Office action response filed in U.S. Appl. No. 13/107,824 on Jul. 3, 2014.

* cited by examiner

SYSTEM AND METHOD FOR DETECTING GENERIC ITEMS IN IMAGE SEQUENCE

TECHNICAL FIELD

The field of the present disclosure generally relates to techniques for detecting the presence of generic items in a video or other sequence of images, or more particularly relates to systems and methods for locating and tracking unidentified objects to minimize retailer losses.

BACKGROUND

Since the shopping cart was invented, retailers have struggled to minimize Bottom-of-the Basket (BoB) losses which occur when costumer inadvertently, or purposefully, fail to pay for items placed on the bottom rack of a shopping cart. In principle, the cashier should verify that all items in the cart and BoB have been accounted for in the purchase. In practice, however, millions of dollars of merchandise are lost every year.

Many solutions to the problem have been attempted, but none of them have satisfactorily solved it. One solution is to place mirrors on the opposite side of the checkout lane, thereby providing the cashier a view of the bottom-of-the-basket for visual inspection. Another solution is to install video cameras aimed at the bottom-of-the-basket in the lane and a display to show the cashier live video of the bottom trays of carts as they pass by. Both these methods require the cashier to continuously monitor the view of the cart in addition to their other responsibilities. Both these methods fail, however, because the cashiers tend to ignore the extra stimulus over time.

Other solutions involve putting special markers on the cart to detect the presence of the cart, and then probe the cart with a beam at the appropriate time to sense whether there is something in the bottom-of-the-basket or not. If something is detected, the cashier is alerted with an audible or visual signal. These systems, although an improvement over the passive systems described above, still fail to prevent BoB loss because the systems are not very accurate and tend to generate too many false alarms. Cashiers tend to lose confidence in the system which they then ignore.

There is therefore a need for a BoB item detection system that can accurately detect the presence of merchandise on a cart with very few false positives and potentially lock the cash register in such a way that the cashier cannot complete the transaction without processing the BoB item.

SUMMARY

A preferred embodiment features a system and method for detecting the presence of objects, either known or unknown, based on groups of visual features extracted from image data In the preferred embodiment, the system is a checkout system for detecting items of merchandise on a shopping cart without the use of reflectors, markers, or other indicia on the cart or merchandise. The merchandise checkout system preferably includes: a feature extractor for extracting visual features from a plurality of images; a motion detector configured to detect one or more groups of the visual features present in at least two of the plurality of images; a classifier to classify each of said groups of visual features based on one or more classification criteria, wherein each of the one or more parameters is associated with one of said groups of visual features; and an alarm configured to generate an alert if the one or more parameters for any of said groups of visual features satisfy one or more classification criteria.

In the preferred embodiment, the images include still or video images of the items on a moving structure such as a shopping cart, including the bottom basket of the shopping cart. The visual features extracted from the images are generated from the graphical and textual indicia on the merchandise packaging. The visual features are preferably scale-invariant features such as Scale-Invariant Feature Transform (SIFT) features and Speeded Up Robust Features (SURF), although various other feature descriptors and detectors known to those skilled in the art are also suitable. Extracted features may be tracked between images as a group using a geometric transform such as an affine transformation or homography transformation, for example.

The parameters used to characterize the images preferably include a translational motion parameter, a rotational motion parameter, a speed parameter, a direction parameter, a number of tracked features parameter, a group entropy parameter, a time of image capture parameter, an aspect ratio parameter, an elapse time parameter, an edge score parameter, a SIFT feature, a SURF feature, a codebook histogram parameter, and combinations thereof. The classifier that distinguishes whether an item is detected or not may be selected from: one or more thresholding conditions, a linear classification, a 3-D Motion Estimation classifier, a Nearest Neighbor classifier, a Neural Network classifier, a Vector Quantization classifier, and combinations thereof.

Another embodiment features a method of detecting an object from a sequence of images, the method comprising: extracting visual features from a plurality of images; detecting one or more groups of the extracted visual features that are present in at least two of the plurality of images; generating one or more motion parameters or appearance parameters to characterize each of the one or more groups of extracted visual features; and generating an alert if the one or more motion parameters or appearance parameters for any of said groups of visual features satisfy one or more classification criteria. The group of matching features may be detected and tracked in multiple image using an affine transform or homography, for example.

BRIEF DESCRIPTION OF THE DRAWINGS

The preferred embodiments of the present invention are illustrated by way of example and not limitation in the figures of the accompanying drawings, and in which.

DETAILED DESCRIPTION OF THE PREFERRED EMBODIMENT

Figure 1:
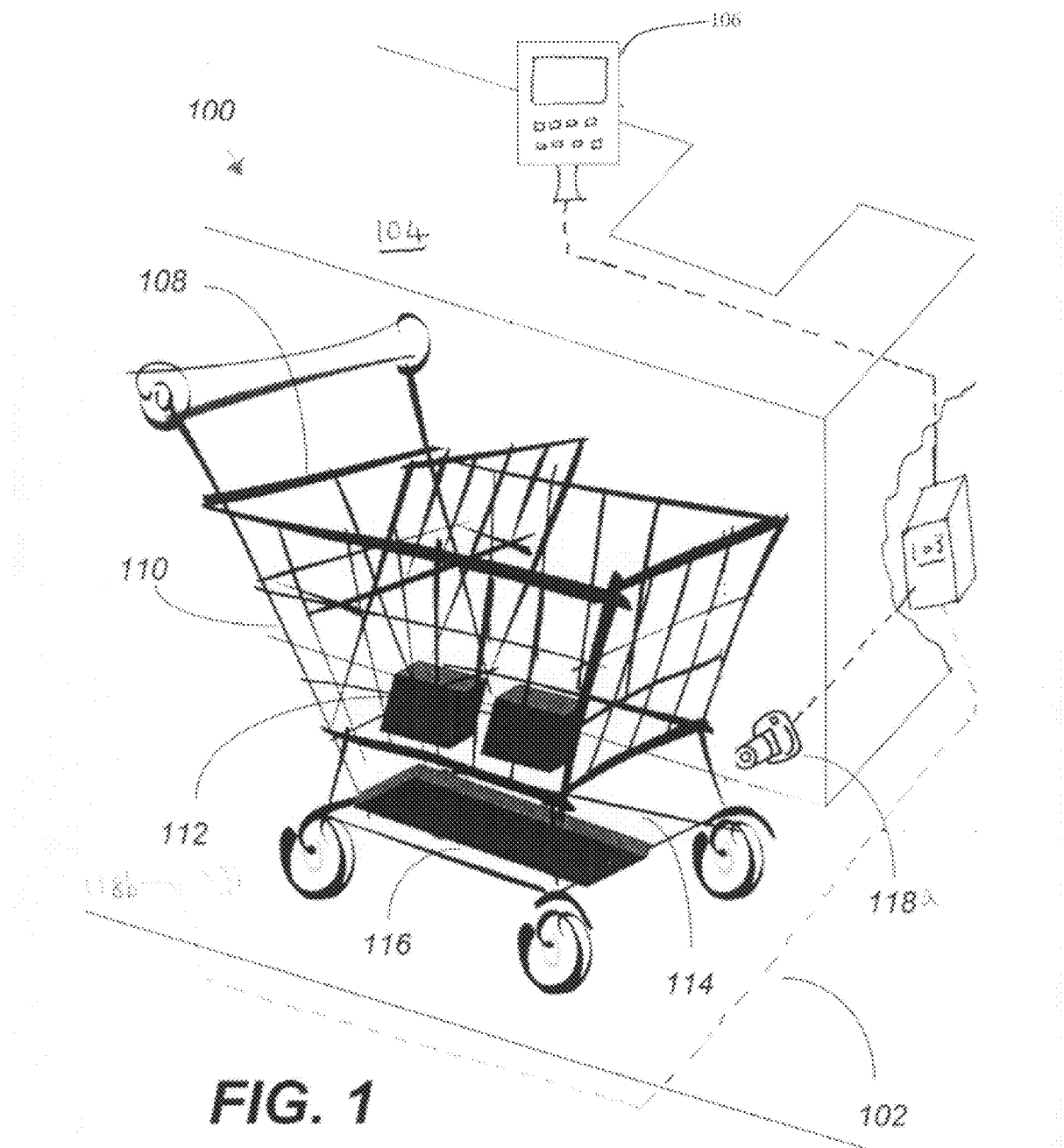
FIG. 1 is a perspective view of a merchandise checkout system for a retail establishment, in accordance with a preferred embodiment.

Illustrated in FIG. 1 is a merchandise checkout system 100 for detecting merchandise being purchased by customers at a checkout terminal in a retail store, for example. In some embodiments, the merchandise checkout system 100 is further configured to identify objects on the shopping cart using the systems and methods taught in U.S. Pat. No. 7,100,824, which is hereby incorporated by reference herein. In the preferred embodiment, however, the merchandise checkout system 100 is configured to detect the presence of merchandise on the cart without necessarily identifying the merchandise. The merchandise checkout system 100 may be particularly useful in situations in which the merchandise on the shopping cart evades identification because the merchandise is obstructed by another object, or because the item is not represented in the database of known objects. The checkout system may also generate an alert to notify the cashier or checkout terminal 106 of the presence, identity, price, and quantity of the items of merchandise 116 in the shopping cart if recognized.

Illustrated in FIG. 1 is a functional block diagram of the merchandise checkout system 100. The system 100 includes one or more visual sensors mounted on one or more sides of the checkout lane to capture a sequence of images of a shopping cart or other moving structure and any merchandise thereon. As such, the visual sensors can capture images of merchandise on a cart 108 without the items being removed from the cart. The set of visual sensors, which generally encompass digital cameras and video cameras, include a first camera 118a mounted in the checkout counter and a second camera 118b mounted in the checkout counter on the opposite side of the lane. The image data from the cameras is transmitted to a local object detection processor 103 installed in the checkout counter, or transmitted to a remote server via wired or wireless network connection. An alert may then be transmitted to the checkout terminal 106 so that appropriate action may be taken, or the information transmitted to the server to update the inventory records.

The object detection processor 103 in the preferred embodiment detects the presence of an unidentified object by tracking scale invariant visual features that match across a sequence of images, generating one or more motion parameters and appearance parameters to characterize the motion of the matching features, and classifying the matching features based on their motion and appearance characteristics. Through this process, visual features associated with merchandise are located, even in the presence of background objects opposite the cart and customers walking next to the cart. The features that satisfy the classification parameters are generally limited to unidentified items of merchandise. An estimate of likelihood that the remaining features are of an item of merchandise may also then be generated for purposes of determining the appropriate response. In the preferred embodiment, the processor 103 generates one of a plurality of types of alerts to notify the cashier of the presence of the item on the shopping cart.

Figure 2:
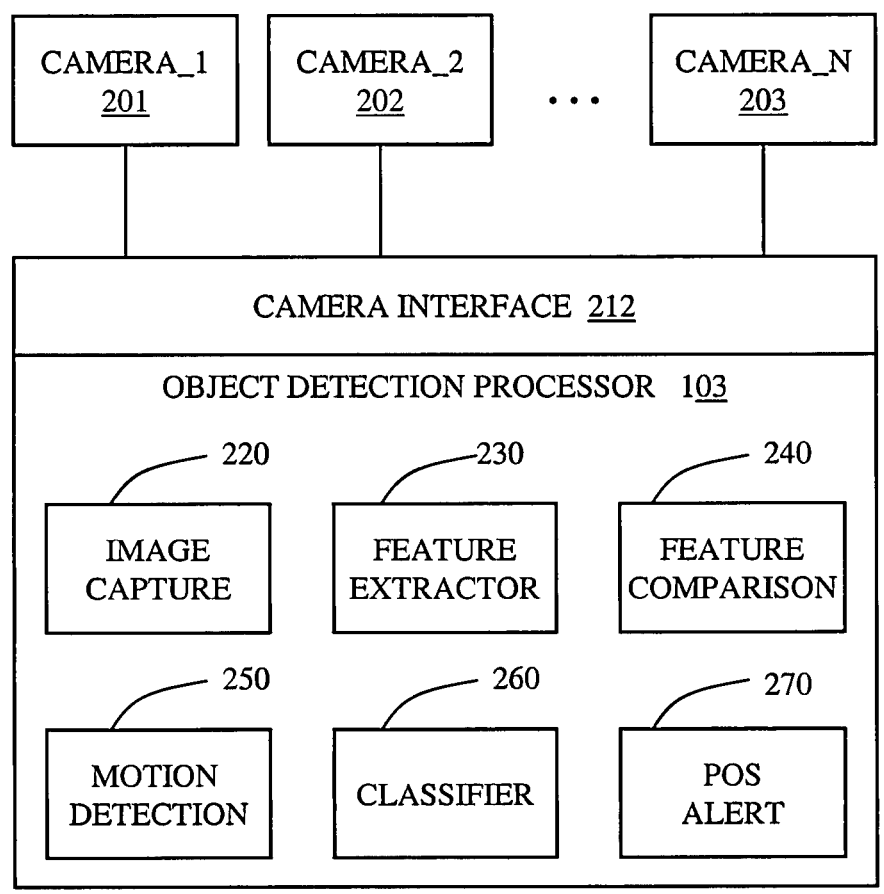
FIG. 2 is a functional block diagram of an exemplary merchandise checkout system, in accordance with a preferred embodiment.

Illustrated in FIG. 2 is a functional block diagram of an exemplary merchandise checkout system. The one or more cameras 201-203 trained on the check out aisle transmit image data to the object detection processor 103 via a camera interface 212. The interface may be adjusted to multiplex the camera feeds and buffer the image data where necessary. In some embodiments, the camera interface 212 is adapted to transmit signals to trigger the cameras 201-203 to capture images at a determined frame, the frame rate being tailored to capture two or more images of the items on the cart as it is pushed through the aisle. The system and method for dynamically capturing the sequence of images is taught in pending U.S. patent application entitled "OPTICAL FLOW FOR OBJECT RECOGNITION," application Ser. No. 11/324,957, filed Jan. 3, 2006, which is hereby incorporated by reference herein.

The object detection processor 103 preferably includes an image capture module 220 configured to receive and preprocess the image data from the cameras 201-203. Preprocessing may include adjusting the image contrast/brightness or resolution, removing distortion including pincushion artifacts, and cropping the image to selectively remove background features or portions of the cart. The image data from the image capture module 220 is received by a feature extractor module 230 which locates keypoints associated with visual features in the images and generates multi-dimensional vectors characterizing each feature. In the preferred embodiment, the visual features are scale-invariant features generated with a scale-invariant feature transform (SIFT) process described in more detail in context of FIG. 4. The feature comparison module 240 is configured to compare the features of different images to match SIFT features and combinations of features that are present in two or more selected images. The motion detector module 250 determines the speed and direction of the objects using the SIFT features common to the selected images. In one embodiment, the motion detector 250 is a motion estimator that estimates movement (e.g., translational movement, rotational movement) of the features between the selected images. As one skilled in the art will appreciate, the objects need not be identified in order to track the features' motion. The classifier 260 is configured to filter SIFT features or groups of features based on various motion parameters and appearance parameters tailored to merchandise or other desirable objects from background and other undesirable objects. If one or more items of merchandise are detected, an alarm referred to herein as the point-of-sale (POS) alert module 270 notifies the cashier of its presence on the cart.

In some embodiments, the object detection processor 103 is also configured to detect and identify merchandise or other objects on the cart 108 where possible. In this configuration, extracted features are compared to a database of features of known objects and the matches used to identify the associated items of merchandise. If the object cannot be identified, the features may then be processed in the manner described herein to detect at least the presence of the object on the cart.

The merchandise detected by the checkout system of the preferred embodiment generally includes consumable and household goods available for purchase in grocery stores, for example. A larger percentage of such goods are marked with graphical indicia including product name, manufacture name, and one or more trademarks and design logos that provide the basis for identification of the object by both customers and the checkout system. Of course, one skilled in the art will appreciate that the checkout system may be employed to detect and/or recognize any number of object types present in retail, wholesale, commercial, or residential settings.

Figure 3:
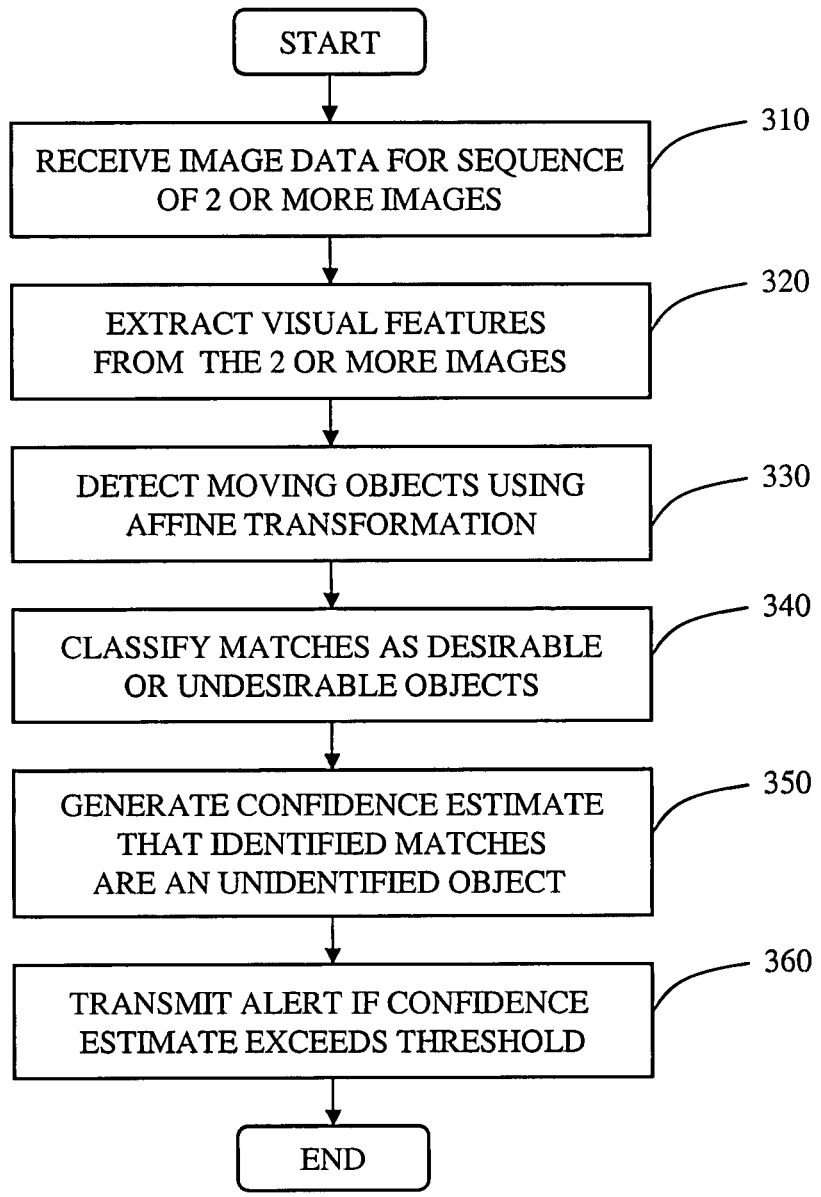
FIG. 3 is a flowchart of a general method of detecting an object on a moving structure, in accordance with a preferred embodiment.

Illustrated in FIG. 3 is a flowchart of a method of detecting objects on shopping carts or other moving structures. As the shopping cart is moved through the checkout lane past a camera 201-203, the object detection processor 103 receives 310 at least two images or selects at least two images from a video sequence. The selected images are acquired at a rate high enough to ensure that an object appears in two or more frames, yet low enough to minimize the error associated with velocity measurements and rotation angle measurements. The object detection processor 103 proceeds to extract 320 features by applying the scale-invariant feature transform to locate keypoints at areas of high contrast in a scale-invariant space, generate a plurality of gradients from the image data in proximity to the keypoint, and generate a feature descriptor vector from the gradient information. This process is repeated for each SIFT feature extracted in all of the two or more images. As one skilled in the art will appreciate, the set of SIFT features derived from the two or more images may inadvertently include visual features associated with background objects and customers in addition to those of merchandise.

The visual features from a first image are compared to the features extracted from the remaining one or more images for purposes of identifying matching features with the same motion, i.e., features that move with a similar direction and speed between the two or more images being compared. In the preferred embodiment, the matching features are detected 330 using an affine transformation, although various transforms including similarity transforms and homography transforms may also be employed. The affine transformation identifies subgroups of features that are common to the two or more images and estimates the translational and rotational movement of the features from the first image to the second. Multiple subgroups can be identified, each subgroup characterized by a unique translational motion, rotational motion, or combination thereof. In general, each subgroup of features identifies one object or multiple objects with the same motion between the two or more images. Features that are present in only one of the two or more selected images, on the other hand, are either used for a confidence estimate or discarded. Even with some of the features discarded, however, the remaining features are generally sufficient to track individual objects in the field of view and distinguish the objects with the same motion from other objects with a different motion.

In another embodiment, segmentation of the image into moving objects can be achieved by the technique of "optical flow," referenced above. According to this method, features need not be explicitly identified, but rather the image is subdivided into a grid of blocks, and each block's motion from one image to another is determined by the known technique of maximizing normalized correlation or the known technique of minimizing the sum of squared differences. Blocks having substantially the same motion can be grouped together to delineate a moving object, thus providing the same type of information that would be obtained by tracking features with an affine transform and grouping features with the same motion. If necessary for the further steps of classification of the detected moving objects, as described below, features can be extracted on the portion of the image identified as a moving object.

With the objects detected and grouped based on similar motion, the objects are classified 340 based upon their motion, appearance, timing, and/or other criteria. In the preferred embodiment, visual features are classified into two groups, the first group including features characteristic of desirable objects and the second group of undesirable objects.

The group of desirable objects consists of those objects that exhibit motion that satisfy a threshold or fall within an allowable range of translation and rotation, for example, while the group of undesirable objects fail to satisfy the translation motion requirement, rotational motion requirement, or both. When implemented to monitor merchandise on a shopping cart, the group of desirable objects is restricted to the set of features having the greatest horizontal motion, substantially no vertical motion, and substantially no rotation. The horizontal motion threshold is consistent with merchandise on the bottom basket of a cart while excluding background objects behind the checkout aisle. The vertical motion and rotational motion thresholds are set to exclude features associated with customers, namely the clothing and shoes of customers for example, as they walk through the aisle. As one skilled in the art will appreciate, different motion criteria may be employed for different applications of the invention including other retail or commercial environments.

After the set of features have been narrowed down to a group of features moving in the horizontal direction, a confidence estimate is generated 350 to assess the likelihood that these remaining set of tracked features are actually associated with an item of merchandise on the cart. The estimate in the preferred embodiment may be based on any number of criteria including, for example, the average or median speed of the object in the horizontal or vertical directions, the number of features satisfying the translational and rotational motion criteria, the entropy of the tracked area, the aspect ratio of the area containing the features, the time since the start of the purchase transaction, the time interval between the consecutive selected images, and the resemblance of the features to an edge. In some other embodiments, the confidence estimate is inferred based on the satisfaction of the classification criteria without the need to generate a numerical estimate.

If the confidence estimate exceeds a user-defined threshold, the object detection processor 103 takes action to alert 360 the cashier or other user that there is an item in the shopping cart. The alert can take the form of an audible alert, a visual alert, or suspension of the transaction until the cashier inspects the cart.

Figure 4:
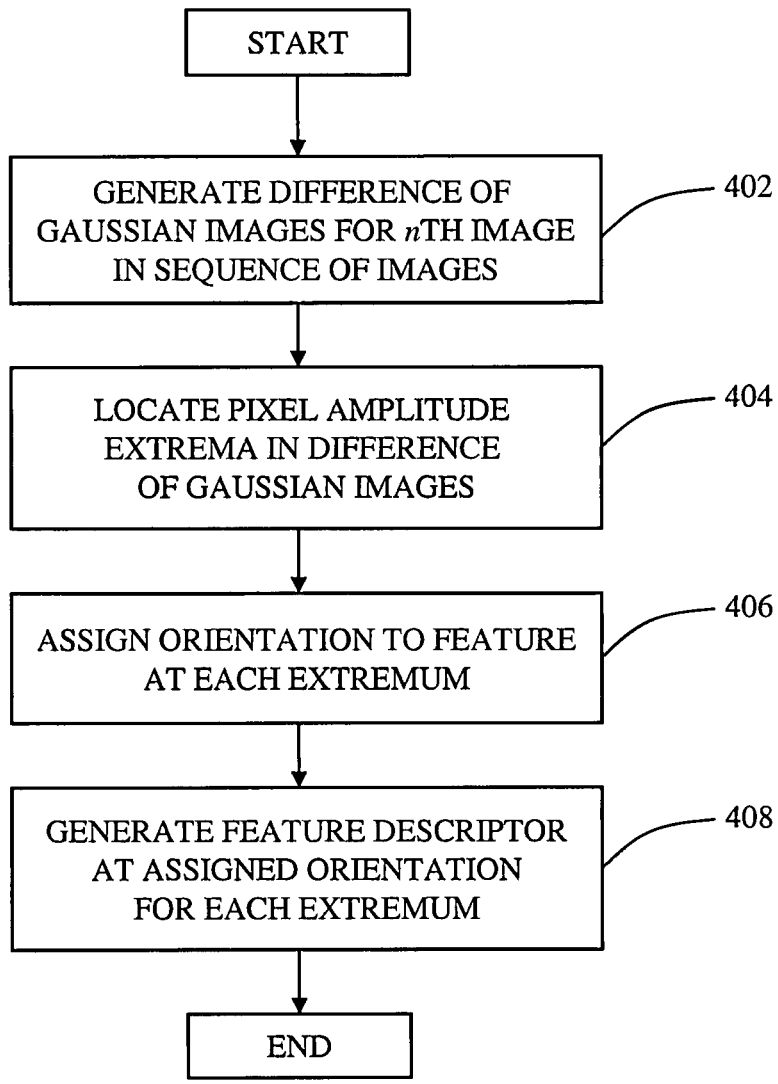
FIG. 4 is a flowchart of the method of extracting scale-invariant visual features, in accordance with a preferred embodiment.

Illustrated in FIG. 4 is a flowchart of the method of extracting scale-invariant visual features in the preferred embodiment. In general, a scale-invariant feature is one that can be reliably detected regardless of the scale with which the object appears in the image. As stated above, the scale-invariant features—preferably SIFT features—are extracted from each of the one or more images of a shopping cart with merchandise therein. Visual features are extracted from a plurality of Difference-of-Gaussian (DoG) images derived from the selected input image. A Difference-of-Gaussian image represents a band-pass filtered image produced by subtracting a first copy of the image blurred with a first Gaussian kernel from a second copy of the image blurred with a second Gaussian kernel. The process of generating DoG images 402 is repeated for multiple frequency bands—that is, at different scales—in order to accentuate objects and object features independent of their size and resolution. While image blurring is achieved using Gaussian convolution kernels of variable width, one skilled in the art will appreciate that the same results may be achieved by using a fixed-width Gaussian of appropriate variance with images of different resolutions produced by down-sampling the original input image.

Each of the DoG images is inspected to determine the location 404 of the pixel extrema, including minima and maxima. To be selected, an extremum must possess the highest or lowest pixel intensity among the eight adjacent pixels in the same DoG image as well as the neighboring-image pixels (either 2 contiguous pixels or nine adjacent pixels) in the two adjacent DoG images having the closest related band-pass filtering, i.e., the adjacent DoG images having the next highest scale and the next lowest scale, if present. The identified extrema, which may be referred to herein as image "keypoints," are associated with the center point of the visual features. In some embodiments, an improved estimate of the location of each extremum within a DoG image may be determined through interpolation using a 3-dimensional quadratic function, for example, to improve feature matching and stability.

With each of the visual features localized, the local image properties are used to assign 406 an orientation (among a 360 degree range of possible orientations) to each of the keypoints. By consistently assigning each of the features an orientation based on the image data, different keypoints may be readily identified within different images even if the object associated with the features is displaced or rotated with respect to the other two or more images. In the preferred embodiment, the orientation is derived from an orientation histogram formed from gradient orientations at all points within a circular window around the keypoint. As one skilled in the art will appreciate, it may be beneficial to weight the gradient magnitudes with a circularly-symmetric Gaussian weighting function where the gradients are based on non-adjacent pixels in the vicinity of a keypoint. The peak in the orientation histogram, which corresponds to a dominant direction of the gradients local to a keypoint, is assigned to be the feature's orientation.

With the orientation of each keypoint assigned, the SIFT processor of the feature extractor generates 408 a feature descriptor to characterize the image data in a region surrounding each identified keypoint at its respective orientation. A feature descriptor is an array of gradient data from the region of the image immediately surrounding an associated keypoint. In the preferred embodiment, the surrounding region within the associated DoG image is subdivided into an M×M array of subfields aligned with the keypoint's assigned orientation. Each subfield, in turn, is characterized by an orientation histogram having a plurality of bins, each bin representing the sum of the image's gradient magnitudes possessing a direction within a particular angular range and present within the associated subfield. As one skilled in the art will appreciate, generating the feature descriptor from the one DoG image in which the inter-scale extrema is located ensures that the feature descriptor is largely independent of the scale at which the associated object is depicted in those images being compared. In the preferred embodiment, the feature descriptor includes a 128 byte array corresponding to a 4×4 array of subfields with each subfield including eight bins corresponding to an angular width of 45 degrees. The feature descriptor in the preferred embodiment further includes an identifier of the associated image, the scale of the DoG image in which the associated keypoint was identified, the orientation of the feature, and the geometric location of the keypoint in the associated DoG image.

The process of generating 402 DoG images, localizing 404 pixel extrema across the DoG images, assigning 406 an orientation to each of the localized extrema, and generating 408 a feature descriptor for each of the localized extrema may then be repeated for each of the two or more images received from the one or more cameras trained on the shopping cart passing through a checkout lane. The SIFT methodology has also been extensively described in U.S. Pat. No. 6,711,293 issued Mar. 23, 2004, which is hereby incorporated by reference herein, and by David G. Lowe, "Object Recognition from Local Scale-Invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

In another embodiment, a scale-invariant and rotation-invariant technique referred to as Speeded Up Robust Features (SURF) is implemented. The SURF technique uses a Hessian matrix composed of box filters that operate on points of the image to determine the location of keypoints as well as the scale of the image data at which the keypoint is an extremum in scale space. The box filters approximate Gaussian second order derivative filters. An orientation is assigned to the feature based on Gaussian weighted, Haar-wavelet responses in the horizontal and vertical directions. A square aligned with the assigned orientation is centered about the point for purposes of generating a feature descriptor. Multiple Haar-wavelet responses are generated at multiple points for orthogonal directions in each of 4×4 sub-regions that make up the square. The sum of the wavelet response in each direction, together with the polarity and intensity information derived from the absolute values of the wavelet responses, yields a four-dimensional vector for each sub-region and a 64-length feature descriptor. SURF is taught in Herbert Bay, Tinne Tuytelaars, Luc Van Gool, "SURF: Speeded Up Robust Features", Proceedings of the ninth European Conference on Computer Vision, May 2006, which is hereby incorporated by reference herein.

One skilled in the art will appreciate that there are other feature detectors and feature descriptors that may be employed in combination with the embodiments described herein. Exemplary feature detectors include: the Harris detector which finds corner-like features at a fixed scale; the Harris-Laplace detector which uses a scale-adapted Harris function to localize points in scale-space (it then selects the points for which the Laplacian-of-Gaussian attains a maximum over scale); Hessian-Laplace localizes points in space at the local maxima of the Hessian determinant and in scale at the local maxima of the Laplacian-of-Gaussian; the Harris/Hessian Affine detector which does an affine adaptation of the Harris/Hessian Laplace detector using the second moment matrix; the Maximally Stable Extremal Regions detector which finds regions such that pixels inside the MSER have either higher (brighter extremal regions) or lower (dark extremal regions) intensity than all pixels on its outer boundary; the salient region detector which maximizes the entropy within the region, proposed by Kadir and Brady; and the edge-based region detector proposed by June et al; and various affine-invariant feature detectors known to those skilled in the art.

Exemplary feature descriptors include: Shape Contexts which computes the distance and orientation histogram of other points relative to the interest point; Image Moments which generate descriptors by taking various higher order image moments; Jet Descriptors which generate higher order derivatives at the interest point; Gradient location and orientation histogram which uses a histogram of location and orientation of points in a window around the interest point; Gaussian derivatives; moment invariants; complex features; steerable filters; and phase-based local features known to those skilled in the art.

Figure 5:
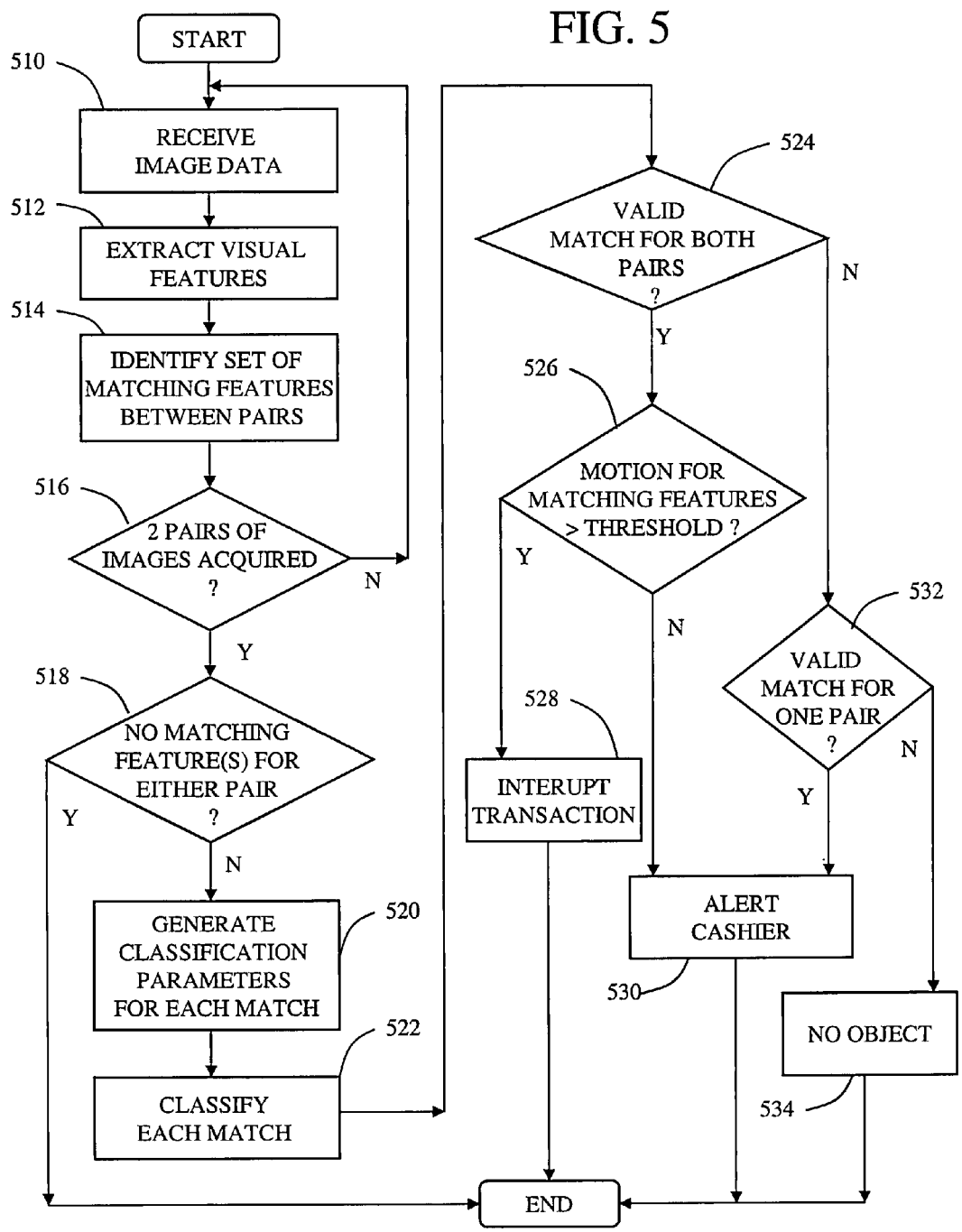
FIG. 5 is a flowchart of a particular method of detecting an object on a shopping cart, in accordance with another preferred embodiment.

Illustrated in FIG. 5 is a flowchart of the preferred method of detecting objects on a shopping cart and alerting a cashier or other user when appropriate. The object detection processor 103 receives 510 (or selects) at least two images from a video sequence as the shopping cart is moved through the checkout lane. Although a camera can easily acquire images at a rate of 30 frames per second, the images selected for object detection can be much less. For a consumer pushing a cart at approximately one mile per hour, the selected images should be captured at a frequency of 1-5 frames per second. The object detection processor 103 proceeds to extract 512 features from the two images using the SIFT process to locate keypoints at areas of high contrast and generate a descriptor for each of the keypoints.

The extracted features are associated with a pair of images are compared for purposes of identifying 514 features having a similar motion or appearance amongst the two images. In particular, the set of visual features from the first image are compared to the features extracted from the second image. When implementing the comparison with an affine transformation, groups of features with the same or similar translational and rotational motion are detected and grouped. Multiple subgroups can be identified, each subgroup characterized by a unique translational motion, rotational motion, or combination thereof. As one skilled in the art will appreciate, the group of features associated with an object— even when not identified—are often readily distinguished or separated from the group of features associated with the background or a customer.

In the preferred embodiment, two or more pairs of images are analyzed in the manner described herein. If only two images are received, decision block 516 is answered in the negative and one or more additional images acquired. In some implementations, the two pairs of images are generated from as few as three images. When relying on three images, the set of visual features from the first image are compared to the features extracted from the second image, and the set of visual features from the second image are compared to the features extracted from the third image.

When at least two pairs of images have been acquired and the matching features amongst each of the pairs identified, decision block 516 is answered in the affirmative. If there are no matching features common to any of the pairs of images, there is insufficient information to detect an object. In this situation, decision block 518 is answered in the affirmative and the process ended. If at least one pair of images yields matching features, however, decision block 518 is answered in the negative and the matching features are subjected to classification.

One or more classification parameters are generated for each of the groups of matching features of each of the pairs of images. The parameters are selected to distinguish objects on a cart from everything else that may pass through the checkout aisle. Classification parameters are generally computed for each subgroup of matching features having the same motion between a pair of images. A list of classification parameters may include, but is not limited to, one or more of the following: (a) horizontal shift, (b) vertical shift, (c) number of tracked features, (d) matching feature entropy, (e) time of image capture relative to start of purchase transaction, (f) aspect ratio, (g) elapse time, (h) edge score, and (i) amount of rotation. The horizontal shift parameter refers to the median horizontal displacement of a subgroup of matching features observed in a pair of images. The vertical shift parameter refers to the median vertical displacement of a subgroup of matching features observed in a pair of images. The number of tracked features parameter refers to total number of matching features associated with a pair of images. The matching feature entropy parameter refers to the entropy associated with the pixel brightness within an area of the image bounded by the group of matching features having the same motion. The time of image capture parameter refers to the time—hour, minute, and/or second—the pair of images are captured by the camera relative to the beginning of the purchase transaction, i.e., the time the customer's first item was scanned in or otherwise rung up. The aspect ratio parameter refers to the ratio of the overall width to the overall height of a box bounding a group of matching features having the same motion. The elapse time parameter refers to the time interval between which two images of a pair are captured. The edge score parameter is a measure of how edge-like the matching features are. The rotation parameter refers to the amount of angular rotation exhibited by a group of matching features with similar motion between a pair of images.

With the classification parameters generated, the object detection processor 103 classifies 522 all the features of the pairs of images to distinguish whether an object is present on the cart and whether to alert the cashier. In general, a group of one or more features is more likely to be classified as an object if the following classification criteria are satisfied: the horizontal motion exhibited by matching features of a pair of images exceeds a determined threshold; the vertical motion exhibited by matching features of a pair of images is zero or below a threshold; the rotation exhibited by matching features of a pair of images is zero or below a minimal threshold; the number of matching features exceeds a threshold indicating that they are statistically significant; the entropy of the area occupied by the matching feature is minimal or below a threshold; the aspect ratio of a group of matching features is distinguishable from the aspect ratio of the structural members of the shopping cart; the elapse time is minimal or below a threshold; and/or the features are characterized by an edge score above a threshold.

The object detection processor 103 is configured to alert the cashier or other user of the presence of the item on the shopping cart or, if appropriate, intervene in the transaction. In the preferred embodiment, the type of alert or intervention depends on the number of subgroups of valid matching features, i.e., groups of features that exhibit the same affine motion, homography motion, or otherwise satisfy the classification criteria. If there is at least one group of matching features validated for each of the two pairs of images, decision block 524 is answered in the affirmative. If the valid matching features also exhibit the appropriate motion, i.e., horizontal motion in excess of a predetermined threshold, the probability of an object being on the cart is relatively high and decision block 526 is answered in the affirmative. The object detection processor 103 then temporarily suspends or interrupts 528 the purchase transaction and prompts the cashier to check unaccounted for items of merchandise on the cart.

If the horizontal motion exhibited by the valid matching features fails to meet the threshold, however, confidence of a positive object detection is high enough to alert the cashier but insufficient to interrupt the transaction. In this case, decision block 526 is answered in the negative and an alert 530 in the form of a visual, audio, or tactile que is presented to the user through the checkout terminal 106, for example. The alert 530 may also include the presentation of an image of the merchandise on the cart—with the associated detected object highlighted—so that cashier can independently verify the presence, quantity, or identify of merchandise therein. The cashier may also be alerted 530 in a similar manner if a valid match is detected in only one of the two pair of images, in which case decision block 532 answered in the affirmative. If there are no valid matching features in either pairs of images, decision block 532 is answered in the negative, the absence of a detected objected confirmed 534, and the customer transaction allowed to proceed without an alert or interruption.

In the preferred embodiment described above, groups of matching features are classified as valid or not based on the application of thresholds to a plurality of motion, appearance, and/or temporal classification parameters. In other embodiments, the classification and validation are performed using other techniques including a linear classification, 3-D Motion Estimation, Nearest Neighbor classification, Neural Network classification, and Vector Quantization classification, for example.

In an exemplary 3-D Motion Estimation technique, rather than finding groups of matching features using an affine transformation (which models motion within the 2-D image plane), a full 3-D motion estimation can be used instead. Such methods are described in the book "Multiple View Geometry in Computer Vision" by Richard Hartlley and Andrew Zisserman (Cambridge University Press, 2000), in chapters 8, 9, 10, and 11, which describes methods using multiple images from a single camera or the images of multiple cameras in combination. The result of such a computation is a set of matching features represented in the two images whose respective 3-D points in space move with a consistent 3-D rigid motion (a 3-D rotation and translation). The object represented by the features can then be verified to be an item or not based on the 3-D motion. For instance, an item in a shopping cart can translate in a direction parallel to the floor, but is unlikely to have a vertical translation component (unlike, say, a purse, a shoe, or pants). Likewise, an item in a shopping cart is likely to rotate along an axis perpendicular to the floor, but should not have rotational components parallel to the floor. The method can also compute the 3-D structure (relative 3-D coordinates) of the object points represented by the matching features in the images, and an analysis of the 3-D structure can further be used to distinguish between items and non-items. For instance, if the 3-D structure lies primarily on a plane parallel to the floor, then it is likely to be the grill of the shopping cart instead of an item, which would tend to have structure on a plane parallel to the floor.

In an exemplary Nearest Neighbor classification technique, a set of sample images with groups of matching features are selected for purposes of training the classifier. The groups of matching features, referred to herein as training matches, are used to construct a classifier in the following manner. First, each training match is manually classified (ground-truthed) as either representing an item or not an item (positive and negative examples, respectively). A value of "1" is associated with each feature of a positive example, and a valve of "0" associated with each feature of a negative example. The training matches are then used to classify groups of a sequence of images. For each feature of group of matching features to be classified, a search is performed for the nearest neighbor feature from the set of training examples. The features of the training examples can be stored in a K-D tree, for example, for efficient searching. After computing the average of the associated value of the nearest neighbors, a threshold can be applied to decide whether to classify the group of matching features as an item or not. As one skilled in the art will appreciate, the threshold may be tuned upward to minimize false-positive detections, tuned downward to minimize the false negative detections, or anywhere there between.

In a neural network classification technique, a neural network is employed to classify a set of matching features. Using a set of ground-truthed matches (both positive and negative examples), an artificial neural network is trained to produce an output value of "1" for features from positive examples and "0" for features from negative examples. To classify a match from an image of a cart, the neural network output—when applied to all the features of the match—is averaged and a threshold applied to the averaged value.

In the Vector Quantization (VQ) classification technique, a match is classified by comparing a codebook histogram (that encodes appearance parameters) generated from the group of features of a match to the empirical codebook histograms derived from a plurality of positive and negative examples that have been ground-truthed. A codebook histogram for a match is computed by counting how many of the features of the match are most similar to each of a set of codebook entries that comprise a codebook.

Figure 6:
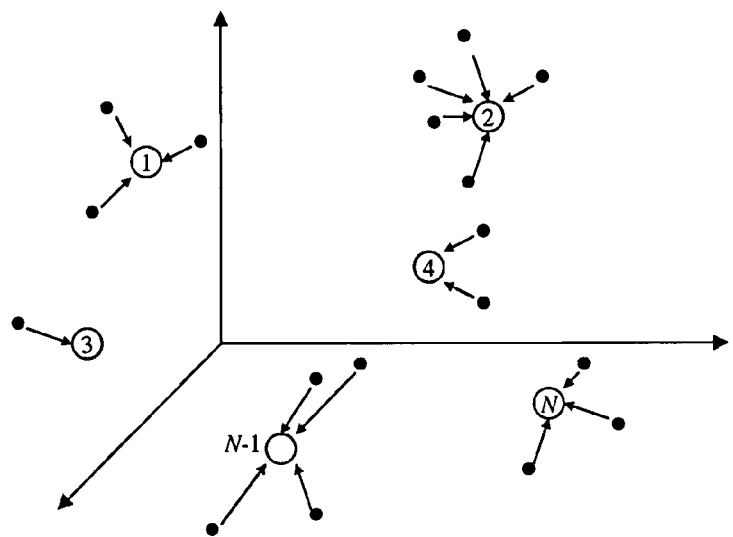
FIG. 6 is a 3-D plot of feature descriptors and codebook entries, in accordance with another preferred embodiment.

Referring to FIG. 6, a codebook refers to a discrete set of elements chosen to represent or quantize the infinite set of continuous-valued SIFT feature vectors. Each of the elements of the codebook is referred to as a codebook entry. A codebook is generated by mapping visual features extracted from a plurality of sample images into the associated feature space. In the preferred embodiment, each N-dimensional SIFT feature vector from a sample image (or region of interest) is mapped into the N-dimensional vector space (N=128). A clustering algorithm is then applied to the map of features to identify clusters of features in proximity to one another as well as the centers of those clusters. The center points associated with the clusters are defined to be the codebook entries with which codebook histograms are formed. The N-dimensional space is diagrammatically represented in FIG. 6, and each codebook entry depicted as a small circle containing a numerical identifier. In some embodiments, a dimensionality-reduction algorithm may be applied to the codebook histogram to reduce the size of the N-dimensional space with minimal impact on the accuracy of the classification. In the preferred embodiment, the clustering algorithm is the k-means clustering technique taught in: "Pattern Classification" by Richard O. Duda, Peter E. Hart, and David G. Stork, pp: 526-528, 2nd Edition, John Wiley & Sons, Inc., New York, 2001, which is hereby incorporated by reference herein.

Figure 7:
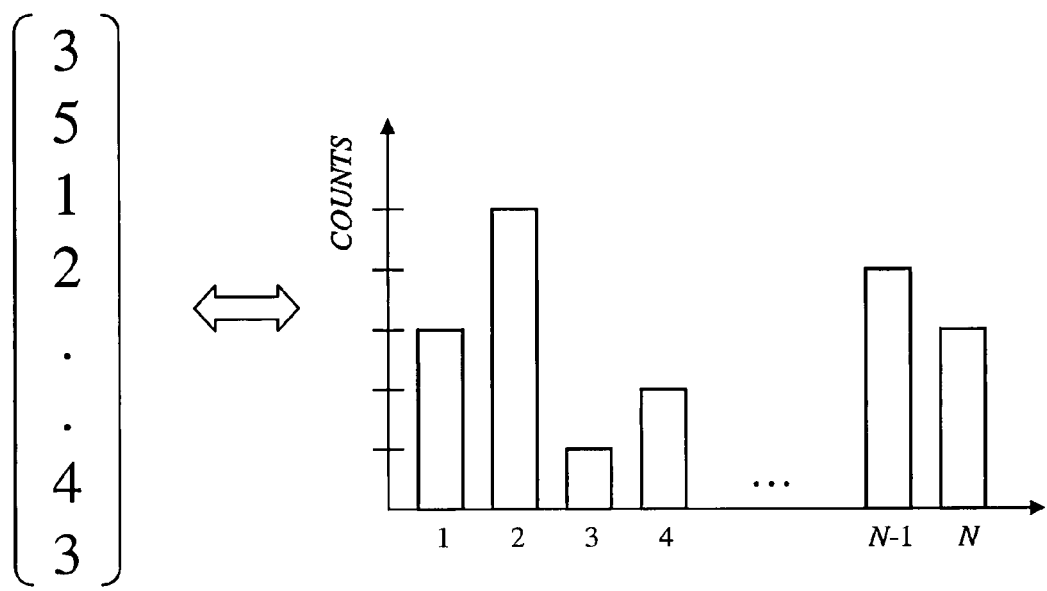
FIG. 7 is a codebook histogram, in accordance with another preferred embodiment.

After the codebook entries are generated, the classifier is trained with training data that has been ground-truthed to affirmatively associate the data with an item of merchandise or a non-item. In the preferred embodiment, groups of matching features from training images are mapped into the feature space and the nearest-neighbor codebook entry identified. Referring to FIG. 6, each SIFT feature is illustrated as a solid point and the nearest-neighbor codebook entry to which each feature collapses is indicated by an arrow. A codebook histogram is used to indicate the number of features of a match for which each codebook entry is the nearest neighbor. In the exemplary codebook histogram shown in FIG. 7, each element of the codebook is designated by an identifier on the horizontal axis. The number of features associated with each codebook entry is indicated by the count on the vertical axis. As shown, the first element of the codebook (identified by 1 on horizontal axis) has a count of three to indicate that three related features are present in the group of matching features used for training. The codebook histogram is also represented in vector format to the left of FIG. 7. A unique codebook histogram, referred to herein as a model histogram, is generated for each of a plurality of positive or negative examples identified by ground-truthing.

Figure 8:
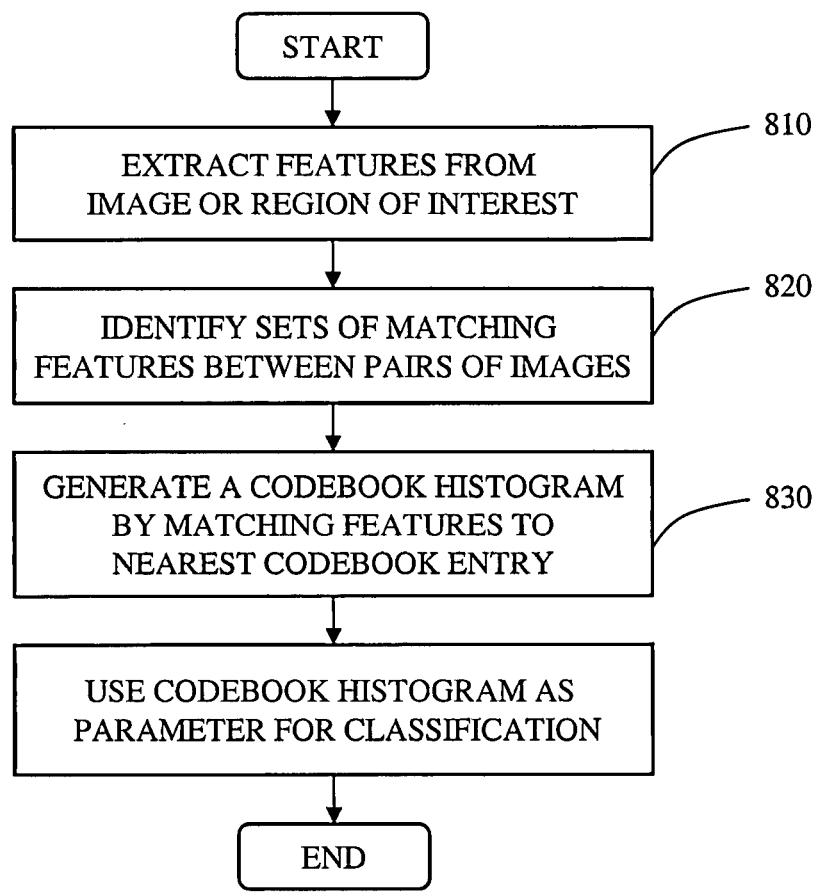
FIG. 8 is a flowchart of the method of generating a codebook histogram for classification, in accordance with another preferred embodiment.

Referring to FIG. 8, once the classifier is trained and the model histograms generated, actual image data is classified by extracting 810 the features from the video data of the shopping cart, identifying 820 at least one group of features exhibiting the same motion, appearance, and/or temporal criteria, generating 830 a candidate codebook histogram by locating the nearest neighbors for each of the features of the at least one group of matching features, and using 840 the candidate codebook histogram as the parameter for classification. In the preferred embodiment, the VQ classifier compares the candidate histogram to each of the plurality of model histograms to identify the most similar model codebook histogram. The VQ classifier then classifies the match as an item of merchandise depending on whether the model histogram identified is associated with a positive example or negative example. Various other methods can be used to compare the candidate codebook histogram of a match to the model codebook histograms from the ground-truthed samples including, for example, support vector machines, nearest neighbor classifiers, or neural networks.

One or more embodiments may be implemented with one or more computer readable media, wherein each medium may be configured to include thereon data or computer executable instructions for manipulating data or computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including general purpose computers, special purpose computers, application-specific integrated circuit (ASIC), and digital/analog circuits with discrete components, for example.

Although the description above contains many specifications, these should not be construed as limiting the scope of the following claims but as merely providing illustrations of some of the presently preferred embodiments.

Therefore, the invention has been disclosed by way of example and not limitation, and reference should be made to the following claims to determine the scope of the present invention.

We claim:

1. A merchandise checkout system for detecting a merchandise item from sequentially captured images, the system comprising:
   a feature extractor for extracting visual features from the sequentially captured images, the extracted visual features characterized by feature vectors;
   a feature comparison module operable to compare visual features extracted from a first image of the sequentially captured images to visual features extracted from a second image of the sequentially captured images to identify a group of extracted visual features that match between the first and second images;
   a classifier operable to measure, for the group of extracted visual features, a classification parameter so as to generate a parameter measurement that collectively characterizes the group of extracted visual features for comparison of the parameter measurement to an associated classification criterion, the associated classification criterion defining a first classification representing presence of merchandise items and a second classification representing presence of non-merchandise items, and the classifier further operable to classify the group of extracted visual features into either the first classification or the second classification based on whether the parameter measurement satisfies the associated classification criterion, wherein the associated classification criterion includes a threshold amount of entropy of an area occupied by the group of extracted visual features; and
   an alarm configured to generate an alert in response to the classifier classifying the group of extracted visual features as belonging to the first classification and thereby indicating the presence of the merchandise item.

2. The system of claim 1, wherein the sequentially captured images comprise images of a moving structure.

3. The system of claim 2, wherein the moving structure is a shopping cart.

4. The system of claim 3, wherein the shopping cart comprises one or more items of merchandise thereon.

5. The system of claim 1, wherein the visual features extracted from the sequentially captured images comprise scale-invariant features.

6. The system of claim 5, wherein the visual features extracted from sequentially captured images comprise scale-invariant feature transform (SIFT) features.

7. The system of claim 1, wherein the classification parameter corresponds to one or both of a translation motion parameter and a rotational motion parameter.

8. The system of claim 7, wherein the translation motion parameter comprises a speed parameter and direction parameter.

9. The system of claim 1, wherein the classification parameter is selected from the group consisting of: a number of tracked features parameter, a group entropy parameter, a time of image capture parameter, an aspect ratio parameter, an elapsed time parameter, an edge score parameter, and combinations thereof.

10. The system of claim 1, wherein the classification parameter corresponds to one or more codebook histogram parameters.

11. The system of claim 1, wherein the sequentially captured images from which visual features are extracted are selected from a video sequence.

12. The system of claim 1, wherein the classifier is selected from the group consisting of: one or more thresholding conditions, a linear classifier, a 3-D Motion Estimation classifier, a Nearest Neighbor classifier, a Neural Network classifier, a Vector Quantization classifier, and combinations thereof.

13. The system of claim 1, further comprising a motion estimator configured to estimate, based on an affine transformation, motion of the group of extracted visual features identified by the feature comparison module.

14. The system of claim 1, further comprising a motion estimator configured to estimate, based on a homography transformation, motion of the group of extracted visual features identified by the feature comparison module.

15. The system of claim 1, wherein the alarm is further configured to:
   temporarily suspends a purchase transaction, or
   generate an audio or visual alert without temporarily suspending the purchase transaction.

16. The system of claim 1, wherein the parameter measurement comprises an amount of horizontal motion of the group, wherein the associated classification criterion includes a threshold of horizontal motion, and the classifier is configured to classify the group into the first classification in response to the amount exceeding the threshold.

17. The system of claim 1, wherein the parameter measurement comprises an amount of vertical motion of the group, wherein the associated classification criterion includes a threshold of vertical motion, and the classifier is configured to classify the group into the first classification in response to the amount being less than the threshold.

18. The system of claim 1, wherein the criterion includes a threshold of rotation.

19. The system of claim 1, wherein the criterion includes threshold number of matching features.

20. The system of claim 1, wherein the criterion includes an aspect ratio of structural members of a shopping cart.

21. The system of claim 1, wherein the criterion includes an expected period between capturing of the first and second images.

22. The system of claim 1, wherein the criterion includes an expected period since a start of a checkout transaction process.

23. The system of claim 1, wherein the criterion includes a threshold edge score.

24. A method of detecting a merchandise item from sequentially captured images, the method comprising:
- extracting visual features from the sequentially captured images, the extracted visual features characterized by feature vectors;
- comparing visual features extracted from a first image of the sequentially captured images to visual features extracted from a second image of the sequentially captured images to identify a group of extracted visual features that match between the first and second images;
- measuring one or both motion parameters or appearance parameters so as to generate a parameter measurement that collectively characterizes the group of extracted visual features for comparison of the parameter measurement to an associated classification criterion, the associated classification criterion defining a first classification representing presence of merchandise items and a second classification representing presence of non-merchandise items, wherein the associated classification criterion includes a threshold amount of entropy of an area occupied by the group of extracted visual features;
- classifying the group of extracted visual features into either the first classification or the second classification based on whether the parameter measurement satisfies the associated classification criterion; and
- generating an alert if the one or both motion parameters or appearance parameters for the group of extracted visual features satisfy the associated classification criterion.

25. The method of claim 24, further comprising using an affine transformation to estimate motion of the group of extracted visual features.

26. The method of claim 24, using a homography transformation to estimate motion of the group of extracted visual features.

* * * * *

UNITED STATES PATENT AND TRADEMARK OFFICE
CERTIFICATE OF CORRECTION

PATENT NO. : 9,064,161 B1  
APPLICATION NO. : 11/811211  
DATED : June 23, 2015  
INVENTOR(S) : Robert Boman et al.

It is certified that error appears in the above-identified patent and that said Letters Patent is hereby corrected as shown below:

In the specification

In column 1, line 17, replace "costumer" with --customers--.

In column 1, line 55, after "data", insert a --.--.

In column 2, line 41, replace "image" with --images--.

In column 3, line 3, replace "embodiment;" with --embodiment.--.

In column 3, line 34, delete "set of".

In column 5, line 64, replace "fail" with --fails--.

In column 6, line 12, replace "have" with --has--.

In column 6, line 15, delete "set of".

In column 8, line 6, replace "extremurn" with --extremum--.

In column 8, line 33, replace "Hessian-Laplace" with --the Hessian-Laplace detector, which--.

In column 8, line 44, replace "June" with --Jurie--.

In column 8, line 47, replace "computes" with --compute--.

In column 9, line 5, insert --that-- before "are".

In column 9, line 7, delete "set of".

In column 9, line 16, replace "are" with --is--.

In column 9, lines 24-25, delete "set of".

Signed and Sealed this  
Eighth Day of December, 2015

Michelle K. Lee  
*Director of the United States Patent and Trademark Office*

CERTIFICATE OF CORRECTION (continued)
U.S. Pat. No. 9,064,161 B1

In the specification

In column 9, line 26, delete "set of".

In column 10, line 33, replace "motion, homography" with --motion or homography--.

In column 10, line 49, replace "que" with --cue--.

In column 10, line 54, replace "identify" with --identity--.

In column 10, line 56, replace "pair" with --pairs--.

In column 11, line 34, replace "are" with --is--.

In column 11, line 43, replace "a sequence" with --matching features extracted from a sequence--.

In column 11, line 43, replace "of group" with --of a group--.

In column 13, line 10, replace "date or" with --data. The--.

In the claims

In column 14, line 59, replace "suspends" with --suspend--.

In column 16, line 3, insert --of-- after "both".

In column 16, line 19, insert --of-- after "both".